United States Patent Office 2,702,776
Patented Feb. 22, 1955

2,702,776
VETERINARY TETRAVALENT TIN COMPOSITIONS

Kathel B. Kerr and Arthur W. Walde, Charles City, Iowa, assignors to Dr. Salsbury's Laboratories, a corporation of Iowa No Drawing. Original application November 20, 1953, Serial No. 393,498. Divided and this application October 11, 1954, Serial No. 461,670

4 Claims. (Cl. 167—53)

This invention relates to a new type of veterinary preparations adapted for use in the treatment of domesticated animals and fowl.

In its more specific aspects the invention pertains to novel preparations and treatments for the prevention and suppression of various pathological conditions which affect the alimentary tract of domestic animals and poultry.

A further object of the invention is the formulation of medicated compositions for enhancing the meat producing capacity of marketable animals and sustaining all or at least part of the normal growth rate under diseased conditions.

The present application is a continuation-in-part of the subject matter of copending application Serial No. 200,310, filed December 11, 1950, now abandoned, and a division of the subject matter of copending application Serial No. 393,498, filed November 20, 1953.

Livestock and birds, as well as dogs, are subject to numerous diseases of highly contagious nature. Among those of economic importance for the poultry and livestock industry are various types of coccidiosis, hexamitiasis in turkeys and worm infections.

Coccidiosis in chickens may be caused by different etiological factors among which *Eimeria tenella* and *Eimeria necatrix* rank as the most devastative species.

*Eimeria tenella* is a protozoan and is responsible for the form of coccidiosis which is generally known as the cecal type. The parasite is introduced into the intestinal tract in the form of encysted oöspores or oöcysts which are found in the droppings and in feed contaminated therewith. After invasion of the digestive system of the host the organism undergoes its natural life cycle, rapidly multiplies, and after release of the sporozoites erodes the epithelial tissue of the cecum and small intestine thereby producing hemorrhage, unthriftiness, weakness, emaciation and death. Mortality due to cecal coccidiosis in chickens during the first month of life has been estimated at 10 to 20 per cent. Older birds which do not succumb to the infection have inferior market value due to debilitation or they may be altogether unfit for consumption.

While *Eimeria tenella* is mainly localized in the cecal area, *Eimeria necatrix*, another protozoan parasite of the coccidial genus, attacks the small intestine involving the middle part of the canal. The pathological conditions developed by this infection may be either acute or chronic. In its acute form the disease may be fatal to the bird five or seven days after infection; the chronic type of the disorder leads to marasmus and progressive emaciation.

Coccidiosis in turkeys may be attributable to a number of coccidial species, such as *Eimeria meleagridis*, *Eimeria meleagrimitis*, *Eimeria dispersa*, *Eimeria gallopavonis*, *Eimeria adenoeides*, and *Eimeria innocua*. While each of these organisms has its own biological and pathogenic pattern and is therefore not necessarily amenable to the same type of chemotherapeutic treatment, the outward symptoms seen in the infections may present a similar picture. They are usually recognized in listlessness, huddling, cheeping and anorexia. Feed consumption decreases about the fourth day following infection with rapid loss of weight and death occurring between the fifth and seventh day. Hemorrhagic diarrhea is likewise observed. Poults under 12 weeks of age are the most vulnerable to the disease.

The principal region of *Eimeria meleagridis* invasion in adult turkeys is the ceca, while in young poults the lower half of the small intestine and the greater part of the large intestinal tract may be likewise attacked. The species of *Eimeria meleagrimitis* on the other hand colonizes the epithelium of the villi of the jejunum during development. Contrary to *Eimeria meleagridis* the schizonts of which parasitize the surface epithelium rather than the glandular parts, *Eimeria meleagrimitis* is deeply embedded in the epithelium below the nucleus.

Hexamitiasis, also known as infectious catarrhal enteritis, is a disease of young poults and presents a serious problem to the turkey industry. Highest mortality is encountered in birds under ten weeks of age. The causative agent of this infection has been recognized to be a member of the Hexamita genus, called *Hexamita meleagridis*. The organism is found in large numbers throughout the small intestine with fewer colonies localized in the ceca. It is a flagellate protozoan and its high incidence in turkey flocks makes it the primary source of contamination. In the first stages of outbreak the pathological syndrome includes nervousness, subnormal body temperature, stilted gait, ruffled feathers and foamy, watery diarrhea. Despite continued undiminished feed consumption the birds lose weight because of digestive difficulties and improper assimilation of the feed. The symptoms grow rapidly worse with listlessness, huddling and coma leading to death. The infection commonly reaches epidemic proportions with a high rate of mortality. In cases of milder and subacute attacks, progressive emaciation is the most prominent sign, and a large number of stunted birds destroy the value of the flock.

Fowl, livestock and other domestic animals are also frequently infected with worms among which the cestodes and nematodes are of chief concern to the veterinarian.

The habitat of cestodes, which are also known by the term of tapeworms, is principally the small intestine of the host. They form typical segments or proglottids which are mostly detectable when passed out in the droppings. The worms have no digestive tract, and depend for their nutriment upon the direct contact of their body surface with the intestinal contents and the lining of the intestinal wall whereon they are anchored by two to four cup-like organs or suckers provided on the head or scolex of the parasite. Supplementary thereto, the scolices of the worms are sometimes equipped with hooks. It is these suckers and hooks which hold the worm in firm attachment to the intestinal wall of the animal and make its removal by chemical agents most difficult. Furthermore the scolex is the portion of the worm which proliferates the proglottids; therefore to completely expel the worm it is necessary to remove the scolex.

One of the most prevalent species of cestodes occurring in poultry is *Raillietina cesticillus*, which invades the lower duodenal and jejunal regions of the infected bird. These parasites are transmitted to the fowl by an intermediate host, such as ground or dung beetles which ingest the worm in the form of its eggs or so-called oncospheres. These in turn develop into another larval stage or cysticercoid in the course of their life cycle. Poultry become infected with *Raillietina cesticillus* by swallowing the intermediate hosts with food or water. After reaching the intestinal tract, the cysticercoid is released from the body of the intermediate host by the action of digestive juices; the inner surface of the larval head which is equivalent to the scolex of the adult worm pushes outward and attaches itself to the intestinal wall. New segments start to form at the posterior or neck portion of the scolex, and within about three weeks develop into fully mature tapeworms. *Raillietina cesticillus* infections in poultry seriously impair the health and normal development of the birds. They may cause irritation and inflammation of the intestinal mucous membranes. As a consequence, growth rates are noticeably decreased, and in more severe cases catarrhal enteritis, diarrhea and general debilitation may result.

Nematodes, or roundworms, are another important and injurious group of poultry parasites. Like the cestodes, some of the roundworm species are of the indirect type, and require an intermediate host for their propagation and dissemination. The more commonly occurring species of nematodes have a direct type of life cycle requiring no intermediate host. In contrast to tapeworms, nematodes are provided with an alimentary tract. They are found in various locations of the avian body, but the gastrointestinal tract is the habitat of the largest number of roundworm species.

One of the most common nematode parasites of fowl is *Ascaridia galli*, which is a large, thick roundworm of yellowish-white color. Infection results from swallowing the infective eggs of the worm by the susceptible bird. The eggs hatch either in the duodenum or in the glandular stomach of the host, and the larvae thereupon penetrate the mucosa. As a result the afflicted chickens suffer from hemorrhage, glandular atrophy, retarded growth, and an increased susceptibility to other diseases. Droopiness, emaciation, and diarrhea are the visible clinical symptoms accompanying the penetration of the parasite.

In dogs, as in poultry, cestodes have an indirect type of life cycle, that is, an intermediate host is involved. A prevalent species of tapeworm parasitizing the dog is *Taenia pisiformis*. This is a large worm, usually seven inches or more in length. The intermediate host is the rabbit in which the cysticercus or larval stage of *Taenia pisiformis* develops. The rabbit acquires its infection from eating food which has been contaminated with fecal material of infected dogs.

Dogs are likewise infected with nematode parasites. Three species are commonly found in the gastrointestinal tract, the dog ascarid *Toxacara canis*; the dog hookworm *Ancylostoma canium*; and the dog whipworm *Trichuris vulpis*. Sheep and cattle are commonly infected with nematode and cestode parasites. Swine are almost universally infected with nematode parasites.

The control of the aforementioned intestinal infections is largely confined to prophylactic management and sanitary measures which are principally directed to the elimination of conditions favorable to the dissemination and transmission of the parasites. This involves not only the extensive removal of potential intermediate hosts and other sources of contamination, but also the maintenance of an environment unsuitable for a possible development of the infective stages of the organisms. Effective sanitation necessarily also includes adequate and frequent disposal of the body wastes containing the potentially infective materials. However helpful and valuable these measures may be, they have their definite limitations, both in respect to their effectiveness and to the expenditure in labor, equipment and materials incurred by these procedures. They require such elaborate and burdensome steps as brooding in special enclosures which have no contact with the soil, raising chickens and poults on perfectly clean ground isolated from other flocks, special equipment for feeding and watering protected against fecal contamination, and quarantining new stock for a prolonged period of time of observation to prevent immediate contact of the old flock with potental disease carriers of fresh arrivals.

Various chemotherapeutic agents have likewise been suggested for the control of the above listed diseases. Their administration in various forms, however, has not been successful for manifold reasons. Some of these substances lack in efficacy, while others are too toxic within the range of their therapeutic potency. Yet other remedies are of no practical value on account of their high cost of preparation. One of the main difficulties in applying certain pharmaceutical compounds is their adverse effect upon the metabolic system of the animal at the required level of medication. This is evidenced by a decrease in food and water consumption, retardation of growth and maturity, and a decline of productivity. In respect to anthelmintic preparations in particular, many of the suggested worm expellers are found to possess such high toxicity that they cannot be administered to the animal with any degree of safety. In order to be effective, the dosages to be given must be adequate to remove the worm; experience, however, has shown that the same dosages of many of the commonly known agents are likewise dangerous to the host. They may imperil the life of the animal itself, interfere with its normal development and growth, or weaken its productivity.

Another problem is the selection of the proper remedy which will act upon the specific parasite involved. This requires a positive identification of the worm before treatment which is not always easy to establish. Moreover, there is frequently occurring a mixed infection with both roundworms and tapeworms and other pathogenic organisms which would call for a more universal therapy by one single drug effecting a complete cure.

Rapidity in action and a high percentage of worm removal and disease survival are additional factors which determine the value of chemotherapeutic preparations. It might not always be possible to accomplish this result with one single material, especially in the case of a mixed infection with several worm species, but a favorable ratio of removal would be a considerable achievement in easing the load of parasites and checking the spread of pathological processes.

Finally, the choice of anthelmintics is often limited by numerous contraindications excluding a certain type of chemical compound which might be otherwise advisable. A calcium deficiency, for instance, would not permit the use of carbon tetrachloride. Other conditions which suggest caution in the use of worm expellants are great debility, gastritis, and enteritis, as well as certain infectious diseases. Here again, however, the advisability of the type of vermifuge will greatly depend upon the necessary dosage of medication in relation to its toxicity to the host. Some of the known drugs have a low potency, and must be administered in substantial amounts for effective worm removal. If the effective level of a material borders upon the threshold of toxicity, it is of questionable value, especially in the presence of other disorders. If, conversely, the level of efficacy lies far below the toxic range, the margin of safety is high; and the wider the span between incipient potency and toxic range, the broader the scope of applicability. It is precisely this latter type of drugs which are the most desirable for anthelmintic therapy and other veterinary purposes and therefore eagerly sought for by the animal husbandryman.

One of the greatest shortcomings of the majority, if not all of the hitherto known veterinary remedies, consists in their high specificity to the causative organism. A medicament that is helpful in combatting *Eimeria necatrix* may have no effect in the control of cecal coccidiosis. Likewise a drug used in the control of hexamitiasis in turkeys will ordinarily be unavailable for the suppression of coccidiosis in the same avian species. Again neither one of these materials has any proven value as an anthelmintic. Frequently, however, an animal is afflicted with more than one single infection at the same time, especially where the causative organism is carried into the system by a worm as an intermediate host. In such cases a fully expedient and adequate cure would require the concurrent administration of several specific drugs which are liable to produce a cumulative toxic effect in the treated animal; or the chemotherapeutic result of these several ingredients so dispensed may altogether be nullified through mutual incompatibility and counteraction.

In the more restricted field of anthelmintics most of the previously employed remedies are limited in action in that they are specific to the type of the parasite, its habitat and host. Thus a variety of chemicals have been suggested for the elimination of worms. The majority of them have a distinct pharmacological function. Carbon tetrachloride, for instance, is effective against roundworms only, but must be administered at a rate of four to five cc. per kilogram body weight which may be injurious to animals in failing health. Chenopodium can be used only against nematodes and is not indicated in the presence of hepatic and gastrointestinal disorders. Phenothiazine is a specific vermicide for poultry and acts exclusively against *Heterakis gallinae*. It has a low margin of safety for swine. As for tapeworms, a large number of drugs have been proposed, but none has turned out to be entirely satisfactory. Kamala, which has been used for many years, seems to remove the chain of proglottids or strobilae only, without affecting the head or scolex which rests attached to the intestine. Areca nut and its active constituent, the highly poisonous arecoline, is an effective cestodicidal drug for dogs, but its efficiency in poultry has not been demonstrated.

Among the more recent developments in the field of anthelmintic therapy, various tin compounds have been investigated with inconsistent results. Some of these substances are of no benefit on account of their toxicity, such as stannous chloride. At tolerable doses it develops taeniacidal activity merely in combination wtih pelletierine which in itself is a remedy in the treatment of cestodes. The same applies to stannous oxide hydrate, the practical value of which depends upon the addition of pelletierine as an essential co-ingredient. Results with other tin compounds are rather erratic and inconclusive. If they show any efficacy at all, their operative dosages lie too close to their toxic level in order to be recommended as vermifuges.

While, as already mentioned, a highly specific and sensitive relationship of action as a rule exists between the chemical structure of a drug and the physiological properties of a parasite in its host environment, it has been discovered that one group of compounds is capable of being applied against more than one species of infectious organisms. This surprising exception to the still valid rule of drug specificity has hardly a precedent in veterinary medicine. No scientific reason can be assigned for this phenomenon. But the multipurpose use of these compounds in the prevention and cure of coincident infections by different parasites makes them of particularly outstanding value in the treatment of animal diseases.

No claim is made that the compounds of this invention constitute a panacea for all and any kinds of disorders although their effectiveness demonstrated in the hereafter exemplified cases may indicate their potential value for the control of similar pathogenic factors.

It is therefore one object of the present invention to propose a novel preparation for the prevention and suppression of certain protozoal infections in chickens and turkeys.

It is another object of the present invention to provide a remedy for the control of hexamitiasis in turkeys.

Still another object of the invention is to devise an anthelmintic agent against tapeworm and roundworm infections in domestic animals and birds, with particular adaptation to the removal of members of the genus *Raillietina*, such as *Raillietina cesticillus*, and of the family of *Heterakidae*, such as *Ascaridia galli*, from fowl in an effective manner and without untoward reactions on the so treated animals.

Yet another and important object of this invention is the provision of veterinary preparations effective in the stimulation of growth, maturation, and resistance to infection.

Other objects and advantages and features of the invention will become apparent from the following disclosure which is primarily intended to be illustrative and not limitative in scope.

The active ingredients of the present invention forming the essential components of the claimed composition can be broadly classified as new types of tetravalent tin compounds which are best represented by the following configuration:

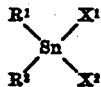

wherein $R^1$ and $R^2$ are alkyl, aryl, aralkyl, or heterocyclic groups, and $X^1$ and $X^2$ stand for anionic radicals.

$R^1$ and $R^2$ may be either of identical structure or of different configurations, as the substituents have been found to be exchangeable for each other without substantially affecting the therapeutic properties of the compounds. The salient feature of this discovery is rather the appreciation of the fact that the molecular arrangement of two covalent organic groups in conjunction with two anionic portions attached to a tetravalent atom of tin imparts to the compound the desired pharmacological qualities. Any derivative of tetravalent tin having the structural pattern will produce the results contemplated within the purview of this invention; and whatever differences in dosages or potencies may appear to be between individual members of these groups, they are but variations in degrees conditioned by the specific substituents; but they are altogether included within a range of potency considerably below the toxic level which is characteristic of this type of compounds and distinguishes them from other tin compositions having a far narrower margin between therapeutic efficacy and toxic reaction.

As previously stated, R may be represented by any substituted or unsubstituted alkyl group derived from the class of paraffins or saturated hydrocarbons. Examples of such residues are methyl, ethyl, propyl, butyl, amyl, hexyl, benzyl, and so forth. The group may comprise straight chain radicals with progressive sequences of carbon linkages, but it may also include homologous derivatives of chain and side-chain isomerism, such as 2-methyl-butyl or isopropyl. The alkyl residues may further be substituted by various other groups, such as hydroxy, halogen and aromatic groups. In this case instances of position isomerism may occur depending upon where the substituent enters the molecule.

R may also stand for unsaturated derivatives of the paraffinic series which are commonly known as alkenes and alkynes. Both straight chain and isomeric substituents can be used within this group and in addition to the previously mentioned possibilities of chain and side-chain isomerism, representatives of position isomerism in the nucleus shall be comprised within the scope of this invention. Examples of this type of substituents are: allyl $CH_2=CH.CH_2-$; 1-butenyl $CH_3.CH_2.CH=CH-$; and its homologous 2-butenyl $CH_3-CH=CH-CH_2-$; or 1-pentynyl $CH_3.CH_2.CH_2.C\equiv C-$, and its isomeric 2-pentynyl $CH_3.CH_2.C\equiv C.CH_2-$.

As a further variation, R may constitute an alicyclic radical which has aliphatic characteristics, for example cyclopropyl and cyclohexyl.

Among the aromatic structures, R may be represented by any substituted or unsubstituted members of the benzene series, such as phenyl, tolyl, xylyl, and cymyl. Each of these residues may again be substituted both in the nucleus and in the side chain. Instead of the phenyl-ring radicals, the next higher homologues can likewise be used to advantage as exemplified by naphthyl and anthracyl, and their variedly substituted derivatives.

X may consist of any combination of elements capable of forming electronegative groups or anionic radicals with any given cationic portion irrespective of the degree of dissociation which such groups within the tin structure of the present invention may show in an electrolytic medium. As such X may consist of organic or inorganic radicals, including oxygenic and sulfidic groups. $X^1$ and $X^2$ collectively may be oxygen or sulfur.

Among the organic series the electronegative groups or anionic portions may be derived from aliphatic carboxylic fatty acids which are of saturated or unsaturated nature. They may be unsubstituted or substituted by hydroxy, amino, sulfo, halogen or other radicals in various manners known to those skilled in the chemical arts. Likewise X may be represented by di- and poly-carboxylic acids of the saturated or unsaturated type in substituted or unsubstituted form, as illustrated by maleic, malic, fumaric, citric and phthalic acid. In addition to the aliphatic series, various aromatic anions may be used. They may have either carboxylic acid structure as in benzoic acid, or be derived from aromatic oxy-compounds as represented by phenolates:

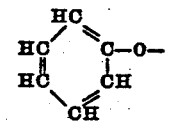

Furthermore the organic anionic radicals may consist of aromatic sulfur derivatives such as benzene-sulfonates:

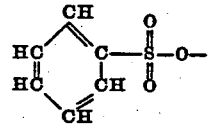

and aromatic arsenic derivatives as typified by benzene-arsonates:

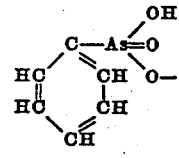

both of which structures may carry various substituents in the benzene ring.

The series of sulfidic anions is basically derived from hydrogen sulfide H—S—H which as an acid is capable of forming numerous salts with metallic bases. When one of the hydrogens in the acid is replaced by $CH_3$, a class of organic compounds is formed which is generally known as mercaptans or thio-alcohols.

Mercaptans are even more acidic than their corresponding alcohols and form salts when treated with basic reactants which are called mercaptides. They ionize in aqueous media by separating into the cationic portion and the anionic moiety $CH_3$—S′. As a further variety of this type of compounds, one or more of the hydrogens in the methyl radical may be replaced by the hydrocarbon portion of a carboxylic acid, its ester or salt and the resulting subsitution product gives rise to the formation of mercaptides of said acids, and esters. The simplest representative of such mercapto-acids is the mercapto-acetic or thioglycollic acid HS—$CH_2$.COOH.

It has been found that compounds of this type are of great therapeutic value in the treatment of the aforementioned infections. If, for example, 1 mol of di-n-butyl-tin sulfide is condensed with 2 mols of butyl-mercapto-acetate, the di-n-butyl-tin di-mercaptide of butyl acetate will result, according to the following probable equation:

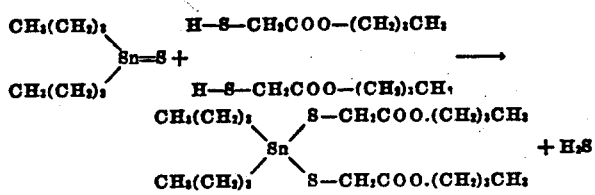

In a similar fashion the di-n-butyl-tin mercaptides of other esters such as iso-octyl-acetate, octadecyl-succinate, 2-butyl-octyl-acetate, ethyl-caprate, and many others can be formed by condensation of 1 mol of di-n-butyl-tin sulfide with 2 mols of the desired mercapto acid ester.

On the other hand an additional therapeutically interesting group of compounds will originate from the reaction of 1 mol of the di-alkyl (aryl or aralkyl) sulfide with 1 mol of an unesterified mercapto-acid. These compounds have the property of polymerizing to higher molecular aggregates and may be formed in the following manner:

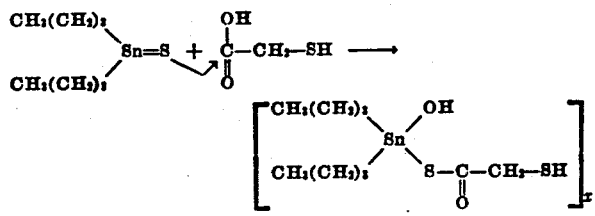

wherein $x$ is a whole number greater than 1.

From the proposed configuration of the condensation product it is apparent that herein the di-n-butyl-tin portion with one valency forms the cationic base of a thio-mercapto-acid while the other valence holds a hydroxyl group; the mercapto grouping —SH remains intact. The structure can be thought of as the result of a molecular rearrangement whereby the hydroxyl of the carboxylic group —CO—OH attaches to the tin and the sulfur of the di-n-butyl-tin sulfide makes linkage with the carboxyl taking the place of the ejected hydroxyl.

In the event that one mol of an unesterified dicarboxylic acid enters into reaction with one mol of dialkyl-(aryl or aralkyl) tin sulfide, one of the valences will form a true salt with one of the carboxyls, while the other valency replaces the hydroxyl of the carboxylic function. If mercapto-succinic acid is used for condensation, the following configurations are possible:

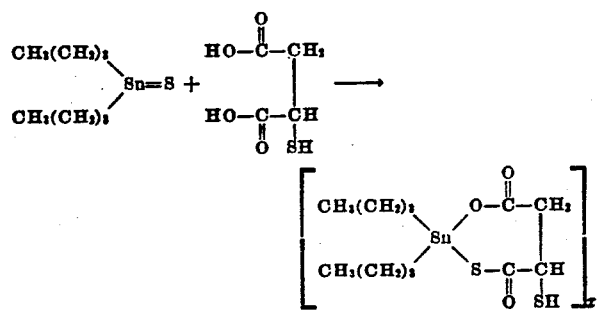

or

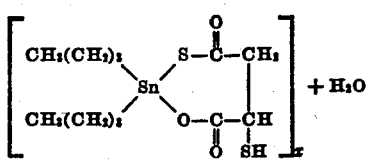

This condensation product which has the tendency to polymerize may be considered as a di-n-butyl-tin mercapto-thio-succinate, $x$ representing a whole number greater than one.

Another group of sulfidic compounds included within the purview of this invention are the polymerized di-alkyl-(aryl, or aralkyl) tin alkoxide-mercaptides which form by condensing 1 mol of the tin-sulfide derivative with 2 mols of an alcohol as illustrated by the following equation:

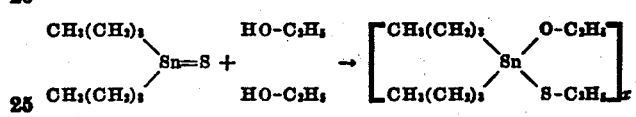

wherein $x$ is a whole number greater than 1. In this particular instance the product may be regarded as a di-n-butyl-tin ethoxide-ethyl-mercaptide.

It should be understood that the above given formulations are presented by way of illustration only and should not be construed as limiting upon the coverage of this type of compounds. Their identity is primarily determined by the indicated mode of preparation in reciting the molecular proportions of the reacting partners. Thus reaction products of 1 mol of di-alkyl-(aryl or aralkyl) tin sulfide with 2 mols of an esterified or neutralized mercapto-acid, or with 1 mol of an unesterified mercapto-acid of either mono- or polycarboxylic structure, and with 2 mols of an alcohol respectively are here claimed as coming specifically within the purview of our tetravalent tin remedies, wherein the di-alkyl-(aryl or aralkyl) portion is attached to an anion. Irrespective of the position of the mercaptide, alcoholate or acid ester linkage in the molecule, all three of these functions are obviously anionic in nature and therefore properly fall within the category of compounds as previously defined.

In the inorganic class, X may stand for halogen and oxygen containing acids, such as chlorides, bromides, iodides, fluorides, and sulfides, sulfates, nitrates, phosphates, chlorates, arsonates, antimonates and many others. Here, as in the case of R, different acid radicals may be paired in X, or one of them may be combined with an oxygenic group in a composite structure. Oxygenic residues may be derived from stannic acid formations such as

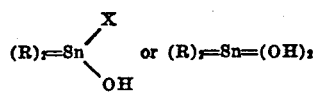

In accordance with our invention it has also been found that certain complex or polymerization products provide an additional variety of excellent veterinary drugs. Instances of such complex formations are:

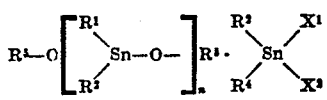

where $R^1$, $R^2$, $R^3$, and $R^4$ may be one of the above described hydrocarbon radicals; $R^5$ may be hydrogen or a hydrocarbon radical; $X^1$ and $X^2$ may be halogens or other anions herein described; and $n$ is a number or improper fraction from 1 to 20, preferably from 3 to 10. Tetravalent tin compounds of this configuration have been disclosed in United States Patent No. 2,604,460.

Hydrolysis in aqueous alkaline solution to dihydrocarbon-tin oxides of varying degrees of polymerization is characteristic of this class of complex tin derivatives.

The tendency of monomeric dihydrocarbon tin oxides to form aggregates of varying degrees of polymerization has been described by Smith and Kipping in J. Chem.

Soc. (1913), 103, 2034, 2050, wherein the resulting products are characterized as closed chain polymers, such as

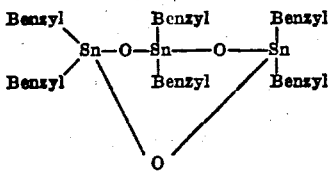

It has likewise been shown in United States Patent 2,626,953 that monomeric dialkyl- or diaryl-tin-dialkoxides which are regarded as ethers of a polystannanediol may form open chain composite structures of more than 1 and up to 20 units depending upon the conditions of temperature and heating time controlling the reaction. In this manner pure polymers or mixtures of polymers may result:

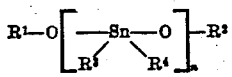

While compounds of this type have here been expressed in terms of simple oxides for the purpose of uniformity, such as di-n-butyl-tin oxide, dibenzyl-tin oxide, di-n-butyl-tin dibutoxide and the like, it is not intended to limit the invention to their monomeric state, and wherever the disclosure refers to dihydrocarbon tin oxides or to derivatives of dihydrocarbon stannanediols, their polymeric condensates are meant to be included. It is readily apparent that the basic configuration of the claimed compounds

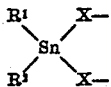

wherein R¹ and R² are hydrocarbons and X may stand for oxygen, is not affected by the status of polymerization, since the primary structure unit is maintained unchanged in all the polymers.

The compositions of the foregoing description are all comprehended within the broad and generic concept of the present invention which, through many hundreds of experiments, is predicated upon the findings that the nature of the substituent has no material bearing upon the pharmacological properties of the compounds; the therapeutic action substantially depends upon the basic configuration as drawn to a tetravalent tin derivative with two of its valencies connected with an alkyl, aryl, aralkyl, or heterocyclic group, and its two other valencies linked to an electronegative or anionic portion. This discovery provides a large choice of remedies for an efficient stannotherapeutic treatment of multiple infections which up to this time has been unavailing because of the high toxicity of the materials hitherto used.

For illustrative purposes, the following compounds are listed as representative members of the series found to be useful within the purview of this invention:

Di-n-butyl-tin diformate
Di-n-butyl-tin dipropionate
Di-n-butyl-tin divalerate
Di-n-butyl-tin dipelargonate
Di-n-butyl-tin diundecylenate
Di-n-butyl-tin dipalmitate
Di-n-butyl-tin diacetate
Di-n-butyl-tin dibutyrate
Di-n-butyl-tin dicaprylate
Di-n-butyl-tin dicaprate
Di-n-butyl-tin dilaurate
Di-n-butyl-tin distearate
Di-n-butyl-tin dimethacrylate
Di-n-butyl-tin di-oleate
Di-n-butyl-tin-maleate
Di-n-butyl-tin di-abietate
Di-n-butyl-tin dimandelate
Di-n-butyl-tin di-d-gluconate
Di-n-butyl-tin dibenzoate
Di-n-butyl-tin di-para-a-cumyl-phenolate
Di-n-butyl-tin bis(3-nitro-benzene)sulfonate
Di-n-butyl-tin arsonate
Di-n-butyl-tin 4-nitro-benzene-arsonate
Di-n-butyl-tin di-(3-nitro-4-hydroxy-benzene)arsonate
Di-n-butyl-tin di-(3-nitro-4-amino-benzene)arsonate
Di-n-butyl-tin diphenoxide
Di-n-butyl-tin dibutoxide
Di-n-butyl-tin dimethoxide
Di-n-butyl-tin (hydroxy)-mercapto-thio-acetate condensate from 1 mol di-n-butyl-tin sulfide and 1 mol mercapto-acetic acid
Di-n-butyl-tin di-(mercaptide-iso-octylacetate) condensate from 1 mol di-n-butyl-tin sulfide and 2 mol iso-octyl-mercapto-acetate
Di-n-butyl-tin di-(mercaptide-ethyl-hexyl-succinate) condensate from 1 mol di-n-butyl-tin sulfide and 2 mol ethyl-hexyl-mercapto-succinate
Di-n-butyl-tin di-(mercaptide-octadecyl-succinate) condensate from 1 mol di-n-butyl-tin sulfide and 2 mol octadecyl-mercapto-succinate
Di-n-butyl-tin di-(mercaptide-2-butyl-octyl-succinate) condensate from 1 mol di-n-butyl-tin sulfide and 2 mol 2-butyl-octyl-mercapto-succinate
Di-n-butyl-tin di-(mercaptide-octadecyl-acetate) condensate from 1 mol di-n-butyl-tin sulfide and 2 mol octadecyl-mercapto-acetate
Di-n-butyl-tin mercapto-thio-succinate polymer condensate from 1 mol of di-n-butyl-tin sulfide and 1 mol mercapto-succinic acid
Di-n-butyl-tin di-(mercaptide-butyl-acetate) condensate from 1 mol di-n-butyl-tin sulfide and 2 mol butyl-mercapto-acetate
Di-n-butyl-tin ethoxide-ethyl-mercaptide polymer condensate from 1 mol di-n-butyl-tin sulfide and 2 mol ethyl alcohol
Di-allyl-tin dilaurate
Di-ethyl-tin dilaurate
Di-methyl-tin dilaurate
Di-methyl-tin diacetate
Di-amyl-tin dilaurate
Di-amyl-tin-maleate
Di-n-butyl-tin oxide
Di-n-butyl-tin stannonic acid
Di-n-butyl-tin sulfate
Di-n-butyl-tin sulfide
Di-n-butyl-tin dichloride
Complex di-n-butyl-tin oxide-dichloride polymer
Di-n-butyl-tin dihydrogenphosphate
Di-n-butyl-tin difluoride
Di-isopropyl-tin di-iodide
Di-carbethoxy-ethyl-methyl-tin dibromide
Di-lauryl-stannonic acid
Di-phenyl-tin dilaurate
Di-phenyl-tin diacetate
Di-phenyl-tin dichloride
Di-phenyl-tin oxide
Di-benzyl-tin dilaurate
Di-benzyl-tin diacetate
Di-benzyl-tin dichloride
Di-benzyl-tin oxide
Di-para-chlorobenzyl-tin dichloride
Di-para-chlorobenzyl-tin oxide
Di-methyl-tin di-iodide
Di-ethyl-tin di-iodide
Di-amyl-tin di-iodide
Di-lauryl-tin dichloride In order to accomplish the objectives sought by this invention the foregoing compounds are administered orally to the animals in critical amounts so as to produce the beneficial effects of anticoccidial and anthelmintic activity, the prevention and control of hexamitiasis and the stimulation of growth.

Conveniently the mode of administration consists in incorporating the active ingredients into a feed ration in such amounts as to provide a daily minimum intake thereof as required by the particular disease or the desired physiological function, hereinafter more fully explained. Rations suitable for medication comprise such elements of sustenance as grain, mash, and scratch for fowl, dog feed and similar animal foods. When administered in the feed, the compound may be first mixed with a small quantity of an inert carrier like fuller's earth or bentonite or any other suitable diluent. This mixture is then introduced into the ration with thorough stirring and shuffling until a uniform blend of even distribution has been obtained.

According to our invention the remedies may also be associated with liquid carriers like water and such compositions may be in the state of solutions, dispersions or suspensions, or other dosage forms which are particularly useful for imbibition. Stable suspensions of some of the less soluble compounds can be obtained by the addition of emulsifiers among which polyoxyethylene-lauryl-ether and Emulcol H-72, a condensation product of a fatty acid with a polyhydric alcohol, are most suitable for practical purposes. Other liquid vehicles for medication may be edible oils, such as olive, peanut, coconut and cottonseed oil wherein the tetravalent tin compounds may be dispersed. Various other orally ingestible diluents may likewise be used.

Although the compounds are advantageously given in the normal diet of feed, water and similar elements of sustenance, they may also be dispensed in individual, unitary doses. Such an alternate form of treatment is of particular value for the elimination of intestinal worms when a speedy removal effect is desired and the size of the flock or the type of animal does not warrant the formulation of solid or liquid medicated rations. Individual doses may take the form of capsules, tablets, granules or powder. When administered in tablets, the same may contain any diluents or ingredients which will impart to them the necessary stability, consistency, cohesion, lubricity and other desirable qualities. Materials used for that purpose are talcum, stearic acid and its salts, such as magnesium stearate, gums, lactose and cornstarch. However we have made the interesting observation that some of the tetravalent tin compositions, like di-n-butyl-tin dilaurate, do not seem to require a lubricant, as they are themselves capable of developing that property in a tablet. Other unitary dosage forms may comprise a gelatine capsule including the active ingredient in dry or liquid suspended state, or crumbles prepared with the aid of inert fillers and a binder.

The effective dosages for most favorable results will be illustrated in fowl and dogs, although it is not intended to limit the invention solely to these particular species of animals. The criterion for proper dosing is the determination of the daily minimum requirements per kg. body weight of the animal for the desired therapeutic treatment; these minimum amounts, however, may vary in accordance with the age, weight and breed of the specimen treated. It is only necessary that the drug constitute a proportion of the medicated vehicle so as to provide an adequate dose for the animal consuming it when allowed to feed ad libitum on its normal diet.

It has thus been found that the smallest daily amount of active ingredient required to stimulate growth and maturation in chickens is 1 mg. per kg. body weight, when feed is the vehicle of administration. In order to supply this minimum dosage of daily drug intake, the compounds would have to be added to a normal feed ration in a ratio of approximately 0.002%. The concentration may be raised with equal beneficial effect up to 0.05% which amounts to a daily dose of approximately 70 mg. per kg. body weight. Optimal results were obtained with ratios between 0.01% and 0.05% when the treatment was continued for five weeks.

Each test in the following growth studies involved newly hatched chicks of a given breed which were divided into two groups one of which was treated while the other served as unmedicated control. From carefully maintained weight records the mean weight gains of the birds in the treated and in the control groups were determined and the ratios of weight increases calculated. These figures multiplied by 100 represent the percentages of weight gains attained by the treated birds as compared with the untreated ones. Thus, if the average gain for a group of treated chickens was found to be 348.3 gm. and the gain of the controls 252.8 gm., the percentage of weight gain, expressed as "Ratio T/C%" would be:

$$\frac{348.3}{252.8} \times 100 = 137.8\%$$

EXAMPLE 1

Ninety three-day-old New Hampshire chicks were divided into three groups of 30 specimens each. Groups 1 and 2 received a medicated feed ration containing respectively 0.01% and 0.02% of di-n-butyl-tin sulfide for five weeks, while the third group was placed on an unmedicated diet. The mean weight gain for the untreated birds at the end of the test period was 252.8 gm., while Group 1 showed a weight increase of 348.3 gm. and Group 2 a gain of 344.3 gm. It follows that the "Ratio T/C" for a concentration of 0.01% was 137.8% and that for a concentration of 0.02% was 136.2%. Additional test data on the tonic effects of other compounds in different proportions are summarized in Table I.

Table I

| Birds, No. | Compound | Conc. Feed, Percent | Medication Period, Weeks | Avg. Wt. Gain Per Bird, Grams | Ratio, T/C Percent |
|---|---|---|---|---|---|
| 30 | Diphenyl-tin dichloride | 0.0025 | 5 | 362 | 113.1 |
| 30 | do | 0.0050 | 5 | 398 | 124.3 |
| 30 | do | 0.0250 | 5 | 402 | 125.6 |
| 30 | do | 0.0500 | 5 | 391 | 122.0 |
| 30 | None | | 5 | 320 | |
| 24 | Dibenzyl-tin dichloride | 0.0500 | 5 | 381 | 116.0 |
| 24 | do | 0.0250 | 5 | 397 | 121.0 |
| 24 | do | 0.0050 | 5 | 376 | 114.0 |
| 24 | do | 0.0025 | 5 | 369 | 112.0 |
| 24 | None | | 5 | 329 | |
| 25 | Dimethyl-tin di-iodide | 0.0020 | 5 | 369 | 114.8 |
| 25 | do | 0.0040 | 5 | 363 | 113.0 |
| 25 | do | 0.0080 | 5 | 374 | 116.2 |
| 25 | do | 0.0160 | 5 | 382 | 119.0 |
| 25 | None | | 5 | 321 | |
| 21 | Complex di-n-butyl-tin oxide-dichloride polymer | 0.0025 | 5 | 375 | 121.0 |
| 21 | do | 0.0050 | 5 | 369 | 118.9 |
| 21 | do | 0.0100 | 5 | 384 | 124.0 |
| 21 | do | 0.0200 | 5 | 377 | 121.5 |
| 21 | None | | 5 | 310 | |

Similar good results of stimulative action are obtained with medicated water when a daily minimum dosage of 2 mg. per kg. body weight is provided. In order to assure a drug intake on that level, a suspension having a strength of at least 0.0025% is prepared and offered to the bird for imbibition ad libitum for the duration of the test. The strength of the drinking potion can be raised up to 0.06% corresponding to 140 mg. per kg. body weight as shown in the following example.

EXAMPLE 2

In all the tests tabulated hereafter, equal numbers of three-day-old New Hampshire chicks, on the average between 24 and 30, were used for the experiment and subjected to a five-week treatment with varying proportions of medicated drinking suspensions. They were formulated by diluting 51.2 grams of the compound with polyoxyethylene laurylalcohol to a final volume of 100 cc. One fluid ounce of this solution to 20 gallons of water yielded a concentration of 0.02% of the compound. A stable dispersion may also be obtained by the use of an emulsifier known as Emulcol H-72 which is a condensation product of a fatty acid with a polyhydric alcohol. The following table shows the growth effects achieved with various compounds and concentrations:

Table II

| Birds, No. | Compound | Conc. Water, Percent | Medication Period, Weeks | Avg. Wt. Gain Per Bird, Grams | Ratio, T/C Percent |
|---|---|---|---|---|---|
| 30 | Di-n-butyl-tin dioleate | 0.0600 | 5 | 373 | 110.2 |
| 30 | do | 0.0400 | 5 | 391 | 115.7 |
| 30 | do | 0.0050 | 5 | 382 | 113.0 |
| 30 | do | 0.0025 | 5 | 375 | 111.0 |
| 30 | None | | 5 | 338 | |
| 26 | Di-n-amyl-tin dilaurate | 0.0400 | 5 | 388 | 120.2 |
| 26 | do | 0.0200 | 5 | 396 | 123.0 |
| 26 | do | 0.0050 | 5 | 386 | 120.0 |
| 26 | do | 0.0025 | 5 | 377 | 117.0 |
| 26 | None | | 5 | 322 | |
| 24 | Di-n-butyl-tin dilaurate | 0.0600 | 5 | 364 | 109.6 |
| 24 | do | 0.0400 | 5 | 372 | 112.0 |
| 24 | do | 0.0100 | 5 | 381 | 114.8 |
| 24 | do | 0.0050 | 5 | 374 | 112.6 |
| 24 | None | | 5 | 332 | |
| 26 | Di-n-butyl-tin diacetate | 0.0400 | 5 | 372 | 109.2 |
| 26 | do | 0.0200 | 5 | 380 | 111.8 |
| 26 | do | 0.0050 | 5 | 384 | 113.0 |
| 26 | do | 0.0025 | 5 | 378 | 111.0 |
| 26 | None | | 5 | 340 | |

For turkeys the daily minimum intake required for stimulative effects is approximately 4 mg. per kg. body weight or 0.005% in the feed. The ratio may be raised to 0.15% with equally favorable results. It is apparent that turkeys require somewhat larger amounts of the active agents to produce the same benefits in view of the physiological peculiarities of this avian species.

EXAMPLE 3

Ninety Beltsville White turkey poults were divided into three groups of 30 birds each. Two groups received a feed ration containing di-n-butyl-tin dilaurate at a level of 0.05% and 0.005%, respectively, while the third group served as control and was kept on an unmedicated diet. The experiment was conducted continuously for a period of five weeks at the end of which the weight gains were established for all the three groups. The average weight increase for Group I was 587.1 gm., that for Group II was 475.4 gm., and the gain for the control group amounted to 399.7 gm. In accordance with the above outlined equation the T/C per cent ratios for Groups I and II are found to be 146.8% and 118.9%. Additional growth tests are summarized in the following table.

Table III

| Birds, No. | Compound | Conc. Feed, Per cent | Medication Period, Weeks | Avg. Wt. Gain Per Bird, Grams | Ratio, T/C Per cent |
|---|---|---|---|---|---|
| 25 | Di-n-butyl-tin dilaurate | 0.100 | 3 | 255.9 | 151.4 |
| 25 | ---do--- | 0.050 | 3 | 235.9 | 139.5 |
| 25 | None | | 3 | 169.0 | |
| 25 | Di-n-butyl-tin dilaurate | 0.025 | 4 | 357.9 | 117.3 |
| 25 | None | | 4 | 305.1 | |
| 30 | Di-n-butyl-tin oxide | 0.050 | 5 | 553.0 | 138.3 |
| 30 | None | | 5 | 400.0 | |
| 30 | Di-n-butyl-tin di-oleate | 0.050 | 3 | 232.0 | 155.7 |
| 30 | None | | 3 | 149.0 | |
| 30 | Di-n-butyl-tin distearate | 0.050 | 3 | 234.0 | 157.0 |
| 30 | None | | 3 | 149.0 | |
| 30 | Di-n-butyl-tin sulfate | 0.050 | 3 | 269.0 | 120.1 |
| 30 | None | | 3 | 224.0 | |
| 30 | Di-n-butyl-tin dibutyrate | 0.050 | 3 | 298.0 | 133.0 |
| 30 | None | | 3 | 224.0 | |
| 25 | Di-n-butyl-tin-4-nitro-benzene-arsonate | 0.025 | 4 | 395.0 | 129.5 |
| 25 | None | | 4 | 305.0 | |
| 25 | Di-n-butyl-tin-4-nitro-benzene-arsonate. | 0.020 | 4 | 371.0 | 115.5 |
| 25 | None | | 4 | 321.0 | |
| 24 | Di-n-butyl-tin dilaurate | 0.150 | 4 | 347.0 | 108.1 |
| 24 | ---do--- | 0.100 | 4 | 352.0 | 109.7 |
| 24 | ---do--- | 0.075 | 4 | 358.0 | 111.5 |
| 24 | ---do--- | 0.050 | 4 | 362.0 | 112.7 |
| 24 | None | | 4 | 321.0 | |

The effective dosage for the suppression and control of coccidiosis in chickens has been found at a minimum level of 12 mg. per kg. body weight daily intake. A preferred dosage range lies between about 12 mg. and 700 mg./kg. body weight of the compounds administered in medicated feed containing sufficient proportions to secure ingestion of these amounts by daily consumption.

More specifically it has been discovered that, while partly overlapping, the ranges applicable to *Eimeria necatrix* and *Eimeria tenella* infections show only slight variations which are due to the nature and degree of virulence of each of these two etiological factors.

For *Eimeria necatrix* the minimum dosage required for effective treatment is approximately 12 mg./kg. body weight per day and can be increased up to 550 mg., corresponding to a feed concentration of 0.025% to 0.4%. The corresponding minimum for the control of *Eimeria tenella* amounts to 19 mg./kg. body weight and might have to be raised up to 700 mg. in the event of a heavy infection of long standing. In order to afford a daily intake of that dose a feed concentration of 0.0375% up to 0.5% is required.

EXAMPLE 4

An even number of New Hampshire chicks were separated into equal groups of four birds each. One group served as control while the remaining groups were placed on a diet containing a tetravalent tin compound in varying amounts between 0.025% and 0.4%. The medicated feed was offered to the birds three days before artificial infection produced with a quantity of sporulated organisms of *Eimeria necatrix* capable of killing approximately 75% of the controls which were infected simultaneously with the test animals. The test group was kept under treatment for 13 days. The following table shows the type of medication and its concentration used, the numerical relationship between the number of survivors and that of the entire treated group, and the ratio between survivors and total controls in the unmedicated group. A comparison of these figures immediately reflects the comparative mortality rate between the treated and untreated birds.

Table IV

| Compound | Conc. Feed, Percent | No. Survivors/Total No. Birds | |
|---|---|---|---|
| | | Treated Group | Untreated Group |
| Diphenyl-tin oxide | 0.100 | 4/4 | 1/4 |
| Do | 0.050 | 4/4 | 1/4 |
| Do | 0.025 | 3/4 | 1/4 |
| Di-n-butyl-tin diacetate | 0.100 | 4/4 | 1/4 |
| Do | 0.050 | 4/4 | 1/4 |
| Di-n-butyl-tin dilaurate | 0.400 | 4/4 | 2/4 |
| Do | 0.200 | 4/4 | 2/4 |
| Do | 0.100 | 4/4 | 2/4 |
| Do | 0.050 | 4/4 | 2/4 |
| Di-n-butyl-tin di-4-nitro-benzene-arsonate | 0.100 | 4/4 | 1/4 |
| Do | 0.050 | 2/4 | 1/4 |
| Dibenzyl-tin dichloride | 0.300 | 4/4 | 2/4 |
| Do | 0.200 | 4/4 | 2/4 |
| Do | 0.150 | 4/4 | 2/4 |
| Do | 0.100 | 4/4 | 2/4 |

EXAMPLE 5

An even number of New Hampshire chicks were separated into equal groups one of which was kept as control while the rest received a medicated feed ration containing varying doses of 0.0375% to 0.5% of one of the tetravalent tin compounds. Three days after the birds were placed on their diet, all the groups were infected with 100,000 oöcysts of *Eimeria tenella* and treatment was maintained for 11 consecutive days. The following table shows the results under headings corresponding to those in the previous example.

Table V

| Compound | Conc. Feed, Percent | No. Survivors/Total No. Birds | |
|---|---|---|---|
| | | Treated Group | Untreated Group |
| Di-n-butyl-tin dilaurate | 0.1000 | 4/4 | 1/4 |
| Do | 0.5000 | 4/4 | 2/4 |
| Do | 0.0375 | 4/4 | 2/4 |
| Di-phenyl-tin dichloride | 0.1000 | 4/4 | 2/4 |
| Do | 0.0500 | 4/4 | 2/4 |
| Do | 0.0375 | 4/4 | 2/4 |

As for coccidiosis in turkeys, the minimum daily dosage required for control has been found to be 10 mg./kg. body weight and may have to be extended up to 230 mg./kg. body weight according to the breed of bird and the severity of the infection. Investigation has further shown that due to the biological differences of the pathogenic factors, *Eimeria meleagridis* requires a little lower dosage than *Eimeria meleagrimitis*. For the former a daily minimum requirement of 10 mg. has been determined of sufficient incipient potency, while the latter necessitates a critical minimum of 20 mg./kg. body weight. Preferred concentration ranges in accordance with these critical values are 0.0125% to 0.2% for *Eimeria meleagridis* and 0.025% to 0.2% for *Eimeria meleagrimitis*.

EXAMPLE 6

Forty-eight New Jersey Buff poults were segregated into twelve groups one of which was set apart as control. The remaining groups were placed on feed medicated with varying doses of tetravalent tin compounds ranging from 0.0125% to 0.2%. After three days of treatment all the birds were infected with 100,000 sporulated oöcysts of *Eimeria meleagridis* and continuously kept on medicated diet for the duration of 13 days. The following summary shows the mortality rates in the same manner as in the foregoing experiment.

Table VI

| Compound | Conc. Feed, Percent | No. Survivors/Total No. Birds | |
|---|---|---|---|
| | | Treated Group | Untreated Group |
| Di-n-butyl-tin dilaurate | 0.2000 | 4/4 | 1/4 |
| Do | 0.1000 | 4/4 | 1/4 |
| Do | 0.0500 | 4/4 | 1/4 |
| Do | 0.0375 | 4/4 | 1/4 |
| Do | 0.0250 | 4/4 | 1/4 |
| Do | 0.0125 | 4/4 | 1/4 |
| Di-n-butyl-tin oxide | 0.0500 | 4/4 | 1/4 |
| Di-n-butyl-tin dichloride | 0.0500 | 4/4 | 1/4 |
| Do | 0.0250 | 4/4 | 1/4 |
| Do | 0.0125 | 4/4 | 1/4 |
| Di-n-butyl-tin 4-nitro-benzene-arsonate | 0.0500 | 4/4 | 1/4 |

EXAMPLE 7

The same technique as in the previous example was used to demonstrate the efficacy of our new remedies against *Eimeria meleagrimitis*. The concentrations in the feed varied between 0.025% and 0.2% in conformity with a daily minimum requisite of 20 mg./kg. body weight which may be increased up to 230 mg. per day. For artificial infection, a preparation of approximately 400,000 sporulated oöcysts of the organism was employed. The results are summarized below.

Table VII

| Compound | Conc. Feed, Percent | No. Survivors/Total No. Birds | |
|---|---|---|---|
| | | Treated Group | Untreated Group |
| Di-n-butyl-tin dilaurate | 0.2000 | 4/4 | 3/4 |
| Do | 0.1000 | 4/4 | 3/4 |
| Do | 0.1000 | 4/4 | 1/4 |
| Do | 0.0500 | 4/4 | 1/4 |
| Do | 0.0250 | 4/4 | 1/4 |
| Di-n-butyl-tin oxide | 0.1000 | 4/4 | 1/4 |
| Do | 0.0500 | 4/4 | 1/4 |

The prevention and control of hexamitiasis in turkeys calls for a daily minimum intake of 10 mg. of the compound per kg. body weight in the feed and about 45 mg. in the water. Optimal results are obtained by a feed ration providing the medicament at a daily rate between 10 and 230 mg./kg. body weight or 0.0125% to 0.2%. When given in drinking water, the preferred dosages lie between 45 and 360 mg./kg. body weight per day, which will be supplied by a strength of 0.02% to 0.1% of the aqueous preparation. As in the previous tests the efficacy of the drug was ascertained on the basis of comparative survival rates of the medicated-infected and the nonmedicated-infected groups. A uniform pattern of high mortality rates in the control groups apparently prevails. As an incidental advantage, it has also been noted that the weight gains of the treated animals were comparatively sustained and at times even substantially increased despite the pathological condition.

EXAMPLE 8

A flock of about three-week-old Beltsville White turkey poults was divided into groups of three and four animals each and a number of control groups were segregated from the test batch. All the birds were placed on medicated feed added with 0.0125% to 0.2% of different tetravalent tin derivatives. Three days after the treatment was started, all the birds were infected with an inoculum prepared from the ileum of specimens which had recently died of hexamitiasis. The ileac fragments were directly introduced into the crop of the animals. All the poults were weighed periodically, and feed and water consumption records were carefully kept on a weekly basis. Daily observations were made for the presence of clinical symptoms such as loss of weight, anorexia, droopiness, emaciation, diarrhea and the appearance of the droppings. Medication was continued for 21 days. The results are tabulated in Table VIII.

Table VIII

| Compound | Conc. Feed, Percent | No. Survivors/Total No. Birds | |
|---|---|---|---|
| | | Treated Group | Untreated Group |
| Di-n-butyl-tin distearate | 0.1000 | 4/4 | 0/4 |
| Do | 0.0500 | 3/4 | 0/4 |
| Di-n-butyl-tin di-oleate | 0.1000 | 4/4 | 0/4 |
| Do | 0.0500 | 2/4 | 0/4 |
| Di-n-butyl-tin maleate | 0.0500 | 4/4 | 0/4 |
| Di-n-butyl-tin oxide | 0.0500 | 4/4 | 0/4 |
| Do | 0.1000 | 4/4 | 1/4 |
| Do | 0.0250 | 4/4 | 1/4 |
| Do | 0.0125 | 3/4 | 1/4 |
| Di-n-butyl-tin dichloride | 0.1000 | 4/4 | 2/4 |
| Do | 0.0500 | 4/4 | 2/4 |
| Di-n-butyl-tin divalerate | 0.1000 | 4/4 | 2/4 |
| Di-n-butyl-tin diacetate | 0.0500 | 4/4 | 2/4 |
| Do | 0.1000 | 4/4 | 2/4 |
| Di-n-butyl-tin diheptylate | 0.1000 | 4/4 | 2/4 |
| Di-n-butyl-tin (hydroxy) mercaptothioacetate polymer | 0.2000 | 3/4 | 1/4 |
| Do | 0.1000 | 4/4 | 1/4 |
| Do | 0.0500 | 4/4 | 1/4 |
| Di-n-butyl-tin dilaurate | 0.1000 | 4/4 | 0/4 |
| Do | 0.0625 | 4/4 | 0/4 |
| Do | 0.0500 | 4/4 | 0/4 |
| Do | 0.0300 | 4/4 | 0/4 |
| Do | 0.0200 | 4/4 | 2/4 |
| Do | 0.0125 | 3/4 | 0/4 |
| Do | 0.0100 | 0/4 | 0/4 |
| Do | 0.0063 | 0/4 | 0/4 |
| Di-n-butyl-tin-bis (3-nitro-benzene) sulfonate | 0.1000 | 4/4 | 1/4 |
| Do | 0.0500 | 4/4 | 1/4 |
| Di-n-butyl-tin sulfate | 0.1000 | 3/3 | 2/4 |
| Di-n-butyl-tin di-4-nitro-benzene-arsonate | 0.0500 | 4/4 | 0/4 |
| Do | 0.0250 | 3/4 | 0/4 |
| Do | 0.0125 | 2/4 | 0/4 |
| Di-n-butyl-tin di-3-nitro-4-amino-benzene-arsonate | 0.0250 | 3/3 | 0/4 |
| Do | 0.0125 | 1/4 | 0/4 |
| Di-n-butyl-tin di-3-nitro-4-hydroxy-benzene-arsonate | 0.0500 | 4/4 | 0/4 |
| Do | 0.0250 | 1/4 | 0/4 |

EXAMPLE 9

Water medication at 0.1% to 0.02% concentrations was tested in a similar manner as in the preceding experiment. The chemoprophylactic potency and control effect appears from the following table.

Table IX

| Compound | Conc. Water, Percent | No. Survivors/Total No. Birds | |
|---|---|---|---|
| | | Treated Group | Untreated Group |
| Di-n-butyl-tin dilaurate | 0.1000 | 3/4 | 0/4 |
| Do | 0.0625 | 4/4 | 0/4 |
| Do | 0.0500 | 4/4 | 0/4 |
| Do | 0.0375 | 4/4 | 0/4 |
| Do | 0.0200 | 3/4 | 0/4 |

As previously mentioned, the stannotherapeutic compositions of our invention provide, besides their remedial and preventive action, an additional benefit by at least sustaining and sometimes even considerably promoting the growth rates of birds afflicted with disease. Special investigations were carried out to demonstrate this effect and the concentrations employed for this purpose conform to the levels established for the control of the various infections illustrated in our previous examples.

EXAMPLE 10

As will be seen from the following table, the stimulating and growth sustaining effects under different pathological conditions are computed in relation to the normal growth rate of an untreated and noninfected bird. Thus, besides the infected and treated test group, two instead of one control groups were assigned to the test, one of which shows the weight gains or losses of the infected-nontreated animal and the other the growth increase of a noninfected-untreated specimen. Only the latter is taken as the comparative basis for the calculation of the T/C % ratio. If, for instance, a turkey afflicted with coccidiosis of the *Eimeria meleagridis* type is treated for 10 days with a basal ration containing 0.025% of di-n-butyl-tin dilaurate, the average weight gain at the end of the period has risen to 229 gm. Without any medication an infected animal not only failed to gain, but registered a weight loss of 25 gm. and lapsed into a state of progressive emaciation. A normal and untreated turkey on the contrary reached a weight gain of 155 gm. in comparison with which the gain of 229 gm. of the infected and medicated animal represents a T/C % ratio of 147.8%. Differently stated, in spite of the disease a medicated animal still shows a meat producing capacity of nearly 50% above that of a normal bird which does not receive the benefit of the treatment.

As may be expected, the stimulative action of the compounds is not of the same potency under all conditions of disease. They will sometimes just sustain the normal rate as illustrated by a T/C % ratio of only 103.2 in the case of hexamitiasis under the effect of di-n-butyl-tin dichloride. If a di-n-butyl-tin (hydroxy)-mercaptoacetate polymer is the remedy of choice, growth can be intensified at least to the extent of 53% of the normal rate, while the denial of any medication to an infected bird would raise its weight to no more than 7.2% above the starting level. It follows that reasonable allowance should be made for variations in potency of the tin remedies, which likewise explains a flexibility of dosages to be applied within the illustrated ranges. (See Table X.)

orally ingestible material or pharmaceutical carriers like gelatine, oils and other carriers known in the veterinary arts as suitable vehicles of medication. One or more single dosages may be manually forced into the animal's digestive tract. The remedy may, for instance, be included in solid form in a gelatine capsule, or it may be dissolved or dispersed in an appropriate liquid to be worked into a gelatine pearl. In other cases it may be advantageous to administer the compound in form of a tablet prepared in conjunction with suitable tablet forming ingredients as previously described.

The minimum single dose of vermifugal medication is 50 mg./kg. body weight. In practice, however, this quantity may have to be increased up to 400 mg. for higher efficacy, depending upon the kind of animal treated, its breed and age, the heaviness of the infection and the potency of the specific agent involved. Obviously, several dosage units below the specified level may be given at about the same time to total an aggregate of the required minimum intake. Thus, for example, if manufacturing conditions or the technique of dispensing the drug make it more expedient, two dosages of 25 mg. instead of one of 50 mg. may be applied simultaneously or within a short time interval. A minimum dose of 50 mg./kg. body weight corresponds to an amount of 3 mg. per dosage unit for a one week old bird of about 60 gm.

The tolerated doses may depend upon the strain or

*Table X*

| Bird | | Disease | Compound | Conc. Feed, Percent | Medication Period, d. or w.[1] | Avg. Wt. Gain Per Bird, Grams | Ratio, T/C Percent |
|---|---|---|---|---|---|---|---|
| Type | No. | | | | | | |
| Turkeys | 4 | E. meleagridis | Di-n-butyl-tin dilaurate | 0.1000 | 10 d. | 229.0 | 148.8 |
| Do | 4 | do | do | 0.0500 | 10 d. | 179.0 | 115.5 |
| Do | 4 | do | do | 0.0375 | 10 d. | 210.0 | 135.5 |
| Do | 4 | do | do | 0.0250 | 10 d. | 229.0 | 147.8 |
| Do | 4 | do | None | | | −25.0 | |
| Do | 4 | do | do | | | 155.0 | |
| Chickens | 4 | E. necatrix | Di-n-butyl-tin dilaurate | 0.4000 | 2 w. | 192.8 | 60.8 |
| Do | 4 | do | do | 0.2000 | 2 w. | 252.5 | 79.6 |
| Do | 4 | do | do | 0.1000 | 2 w. | 255.7 | 80.7 |
| Do | 4 | do | None | | | 6.0 | |
| Do | 4 | do | do | | | 317.3 | |
| Turkeys | 4 | E. meleagrimitis | Di-n-butyl-tin oxide | 0.0500 | 10 d. | 135.2 | 90.7 |
| Do | 4 | do | None | | | 32.7 | |
| Do | 4 | do | do | | | 149.0 | |
| Turkeys | 4 | E. meleagridis | Di-n-butyl-tin dichloride | 0.0500 | 10 d. | 251.7 | 162.9 |
| Do | 4 | do | do | 0.0250 | 10 d. | 236.3 | 152.9 |
| Do | 4 | do | do | 0.0125 | 10 d. | 212.7 | 137.7 |
| Do | 4 | do | None | | | −24.5 | |
| Do | 4 | do | do | | | 154.5 | |
| Turkeys | 4 | Hexamitiasis | Di-n-butyl-tin dichloride | 0.0500 | 18 d. | 525.3 | 103.2 |
| Do | 4 | do | None | | | 238.8 | |
| Do | 4 | do | do | | | 509.2 | |
| Turkeys | 4 | Hexamitiasis | Di-n-butyl-tin di-acetate | 0.1000 | 2 w. | 468.2 | 92.0 |
| Do | 4 | do | None | | | 238.8 | |
| Do | 4 | do | do | | | 509.2 | |
| Turkeys | 4 | Hexamitiasis | Di-n-butyl-tin (hydroxy)mercaptoacetate polymer | 0.0500 | 2 w. | 291.3 | 52.6 |
| Do | 4 | do | None | | | 40.0 | |
| Do | 4 | do | do | | | 553.7 | |

[1] d. means days and w. means weeks.

We have also discovered that certain new types of tetravalent tin compounds are particularly useful and efficient in the chemotherapeutic control of helminthic infections. Their superiority in action resides in a surprisingly high therapeutic index, a high degree of palatability and a more universal range of applicability with respect to a wider variety of worms. The novel tin compounds have a toxicity level far below that possessed by other tin compositions, and manifest at the same time such a high degree of potency that even relatively small dosages of them yield the full benefit of their remedial function. As already demonstrated in reference to other diseases, the compounds have no harmful effect upon the well-being, growth or maturation process of the animals when given under repeated or extended single dose medication due to the favorable relationship between toxic level and vermifugal efficacy. Their activity is directed both against cestodes and nematodes. It is, therefore, possible to combat successfully by the same treatment a mixed infection of poultry with roundworms and tapeworms such as is frequently produced by a concurrent invasion of *Ascaridia galli* and *Raillietina cesticillus*.

For anthelmintic purposes our new agents may be administered not only in feed or water, but also in single unitary doses in combination with any palatable, nontoxic, breed of the animal, the experimental environment and the nature of the compound involved. These factors are well known to or readily ascertainable by a skilled worker in the veterinarian arts. It has been found that New Hampshire and White Leghorn chicks have a somewhat higher tolerance for the tetravalent tin derivatives of our invention than the Ames In-Cross or Nichols strains which are more sensitive to dosages above 100 to 200 mg./kg. body weight. Respecting the possible harmful properties of the compounds, it has been previously observed that the materials as a group possess a relatively high threshold of toxicity. Investigations have shown that some representatives of the series, such as di-n-butyl-tin dipalmitate, di-oleate, dimaleate, and sulfide, lauryl- or phenylstannoic acid, dilauryl-tin oxide and others may be administered without adverse effects in unitary dosages up to 1500 and 2500 mg. and more per kg. body weight. It should, therefore, be noted that amounts of more than the specified ranges will generally be harmless so that in practice only minimum levels need be considered as critical, with the only exception of methyl derivatives. It is well known to pharmacologists, physicians and veterinarians that methyl compounds are ordinarily more toxic than the homologous alkyls of higher molecular weight, wherefore a material like dimethyl-tin sulfide, or diacetate should be used at levels substantially not exceeding the base limit of 50 mg./kg. body weight.

An increase in dosage may also be indicated to combat a relatively heavy load of *Ascaridia galli* in the presence of cestode infection.

When given in the feed for the elimination of internal parasites, rations containing the drugs in an approximate minimum concentration of 0.05%, corresponding to a daily intake of about 25 mg./kg. body weight, have produced excellent results after consumption ad libitum for one or two days. Here again, however, some variations may occur with respect to dosage and duration of treatment according to the type of animal, compound, and nature of infection. In some cases the full benefit of the remedy required a concentration of 0.2% and more.

The following tabulations are representative of some preferred embodiments of the invention applied to anthelmintic treatments which herein shall be illustrated on poultry without, however, thereby limiting the scope of this invention. In fact it has been found that the tetravalent tin compounds according to our invention may be used with like advantage for other animals like dogs, sheep, cattle and swine and will display their vermifugal activity when applied in proper dosages which can be readily determined by those skilled in the art.

Experimental infection of the birds with *Ascaridia galli* was carried out by placing a given quantity of embryonated ova in a small amount of feed which would be consumed by the birds within one or two hours. The number of embryonated eggs varied from 750 to 1500 per bird. The age of the birds so treated was about 10 to 21 days. In order to establish the degree of efficacy of the test compound all the droppings eliminated from the experimental animals for at least three days after medication were carefully examined for worms and their numbers recorded. In this manner the number of worms removed by the treatment was found. When the fecal material no longer showed evidence of worm discharge, the birds were sacrificed and the intestinal tract was examined for remaining worms. Their number added to the number of parasites removed was considered as the total present before treatment was started and the ratio between the total number and the fecal eliminates measured in proportion to 100 defined the percentage of efficacy.

For *Raillietina cesticillus* the birds were given about 50 cysticercoids and the presence of infection was established after about one month by examination of the droppings for segments. The birds were divided into two groups one of which was treated with the compounds of our invention and the other remained untreated and served as control. After 14 days all the birds were killed and necropsy was performed to determine the number of tapeworms retained. The number of parasites found in the untreated group was taken as the probable amount of infection which in comparison with the number of worms unremoved in the treated group, referred to 100, measured the anthelmintic activity of the tested drug.

When the remedy was given in capsule form, feed was withdrawn from the birds at about 5 p. m. the evening preceding the administration of the drug. On the day of treatment the birds were weighed and the suitable amount of drug, calculated on the basis of the required minimum dosage, was placed in the capsule which was then forced into the throat of the animal. In case of feed medication, no previous starvation is required. The birds were weighed in the morning of the treatment and the unmedicated feed was removed. The medicated feed was then weighed into individual cups and placed before the birds. Feed weights were determined at regular daily intervals at the same hour.

The first two of the following tables shows the anthelmintic efficacy of a great variety of our new remedies in their action upon the tapeworm or *Raillietina cesticillus* in poultry. The first column gives the ratio between the total number of experimental birds and the number of proven infections. Next are listed the name of the drug applied and its dosage. In Table XI, showing the results of capsule treatments, the dosage is expressed in mg. per kg. body weight (dose, mg./kg. body wt.). Table XII, illustrating the administration by feed, lists the amount of drug per 100 grams of feed (dose, mg./100 gm.) and in addition the calculated total dose consumed by the bird over a period of one or two days referred to kg. body weight (calc. dose, mg./kg. body wt.) as determined by the aforementioned daily weighings of the feed cups. Thus 50/1 designates the amount of 50 mg. drug per 100 grams of feed during a period of one day, 50/2 the same dosage administered for two days. The last two columns of Tables XI and XII record the number of tapeworms found at necropsy and the efficacy in per cent as calculated from the base figure of the unmedicated controls listed in the last horizontal line of each experiment.

Tables XIII and XIV follow the same arrangement as that of the two preceding tables. They tabulate the results obtained in the removal of *Ascaridia galli*, Table XIII by capsule and Table XIV by feed medication. The dosages for capsule and feed are reported under corresponding captions as in the preceding tables, followed by columns listing the total number of ascaridiae as previously explained in the outline of the procedure. The next following column registers the number of parasites removed and found in the droppings; the last column gives the per cent of efficacy as computed from the two last named figures. (See Table XI).

Table XI

CAPSULE MEDICATION FOR *RAILLIETINA CESTICILLUS*

| No. Birds; No. Infected | Compound | Dose, mg./kg. Body Wt. | Tapeworms at Necropsy, No. | Efficacy, Percent |
|---|---|---|---|---|
| 4/2 | Diethyl-tin di-iodide | 100 | 0 | 100 |
| 4/1 | ----do---- | 200 | 0 | 100 |
| 10/8 | Unmedicated controls | ---- | 193 | ---- |
| 4/2 | Di-isopropyl-tin di-iodide | 100 | 0 | 100 |
| 4/2 | ----do---- | 200 | 0 | 100 |
| 8/8 | Unmedicated controls | ---- | 64 | ---- |
| 4/4 | Di-allyl-tin dilaurate | 100 | 101 | 4 |
| 4/4 | ----do---- | 200 | 40 | 62 |
| 8/8 | Unmedicated controls | ---- | 216 | ---- |
| 4/3 | Di-n-butyl-tin dichloride | 100 | 0 | 100 |
| 4/3 | ----do---- | 200 | 0 | 100 |
| 9/7 | Unmedicated controls | ---- | 271 | ---- |
| 4/4 | Di-n-butyl-tin oxide | 100 | 16 | 82 |
| 4/4 | ----do---- | 200 | 0 | 100 |
| 10/10 | Unmedicated controls | ---- | 271 | ---- |
| 4/4 | Di-n-butyl-tin diformate | 100 | 5 | 97 |
| 4/3 | ----do---- | 200 | 0 | 100 |
| 10/10 | Unmedicated controls | ---- | 379 | ---- |
| 4/3 | Di-n-butyl-tin diacetate | 100 | 16 | 76 |
| 4/3 | ----do---- | 200 | 2 | 96 |
| 4/4 | Unmedicated controls | ---- | 72 | ---- |
| 4/3 | Di-n-butyl-tin dipropionate | 100 | 3 | 91 |
| 4/4 | ----do---- | 200 | 0 | 100 |
| 5/5 | Unmedicated controls | ---- | 57 | ---- |
| 4/3 | Di-n-butyl-tin di-n-butyrate | 100 | 2 | 94 |
| 4/4 | ----do---- | 200 | 0 | 100 |
| 5/5 | Unmedicated controls | ---- | 57 | ---- |
| 4/4 | Di-n-butyl-tin di-n-valerate | 100 | 33 | 51 |
| 3/2 | ----do---- | 200 | 14 | 59 |
| 8/7 | Unmedicated controls | ---- | 118 | ---- |
| 4/3 | Di-n-butyl-tin di-n-caproate | 100 | 6 | 88 |
| 4/3 | ----do---- | 200 | 6 | 88 |
| 8/7 | Unmedicated controls | ---- | 118 | ---- |
| 4/4 | Di-n-butyl-tin di-n-heptylate | 100 | 38 | 44 |
| 4/4 | ----do---- | 200 | 1 | 99 |
| 8/7 | Unmedicated controls | ---- | 118 | ---- |
| 4/3 | Di-n-butyl-tin di-n-caprylate | 100 | 5 | 96 |
| 4/4 | ----do---- | 200 | 0 | 100 |
| 10/10 | Unmedicated controls | ---- | 379 | ---- |
| 4/4 | Di-n-butyl-tin dipelargonate | 100 | 18 | 73 |
| 4/2 | ----do---- | 200 | 8 | 76 |
| 8/7 | Unmedicated controls | ---- | 118 | ---- |
| 4/4 | Di-n-butyl-tin dipelargonate | 400 | 0 | 100 |
| 8/8 | Unmedicated controls | ---- | 164 | ---- |
| 4/4 | Di-n-butyl-tin dicaprate | 100 | 9 | 87 |
| 4/2 | ----do---- | 200 | 0 | 100 |
| 8/7 | Unmedicated controls | ---- | 118 | ---- |
| 4/3 | Di-n-butyl-tin di-undecylenate | 100 | 35 | 12 |
| 4/4 | ----do---- | 200 | 29 | 57 |
| 8/7 | Unmedicated controls | ---- | 110 | ---- |
| 3/3 | Di-n-butyl-tin dilaurate | 100 | 7 | 93 |
| 7/7 | Unmedicated controls | ---- | 214 | ---- |
| 3/3 | Di-n-butyl-tin dilaurate | 200 | 13 | 88 |
| 4/4 | Unmedicated controls | ---- | 146 | ---- |
| 7/7 | Di-n-butyl-tin dilaurate | 100 | 15 | 90 |
| 10/10 | Unmedicated controls | ---- | 219 | ---- |
| 2/2 | Di-n-butyl-tin dilaurate | 200 | 0 | 100 |
| 5/3 | Unmedicated controls | ---- | 15 | ---- |
| 3/1 | Di-n-butyl-tin maleate | 100 | 1 | 80 |
| 7/3 | Unmedicated controls | ---- | 15 | ---- |
| 4/4 | Di-n-butyl-tin dimaleate | 200 | 0 | 100 |
| 10/10 | Unmedicated controls | ---- | 219 | ---- |
| 4/4 | Di-n-amyl-tin di-iodide | 100 | 55 | 53 |
| 4/4 | ----do---- | 200 | 3 | 97 |
| 6/6 | Unmedicated controls | ---- | 174 | ---- |
| 4/3 | Diphenyl-tin dichloride | 100 | 0 | 100 |
| 4/2 | ----do---- | 200 | 0 | 100 |
| 8/7 | Unmedicated controls | ---- | 118 | ---- |
| 4/4 | Di-benzyl-tin dichloride | 100 | 0 | 100 |
| 4/4 | ----do---- | 200 | 0 | 100 |
| 5/5 | Unmedicated controls | ---- | 75 | ---- |
| 4/4 | Di-ethyl-tin dilaurate | 100 | 0 | 100 |

Table XI—Continued.

CAPSULE MEDICATION FOR RAILLIETINA CESTICILLUS

| No. Birds; No. Infected | Compound | Dose, mg./kg. Body Wt. | Tapeworms at Necropsy, No. | Efficacy, Percent |
|---|---|---|---|---|
| 8/8 | Unmedicated controls | | 216 | |
| 4/4 | Di-ethyl-tin dilaurate | 200 | 0 | 100 |
| 8/8 | Unmedicated controls | | 155 | |
| 4/4 | Di-n-butyl-tin sulfate | 100 | 14 | 87 |
| 4/4 | ...do | 200 | 2 | 98 |
| 8/8 | Unmedicated controls | | 216 | |
| 4/4 | Complex di-n-butyl-tin oxide-dichloride polymer | 100 | 0 | 100 |
| 4/3 | ...do | 200 | 0 | 100 |
| 8/8 | Unmedicated controls | | 64 | |
| 4/4 | Di-amyl-tin dilaurate | 200 | 1 | 99 |
| 4/4 | Unmedicated controls | | 296 | |
| 4/4 | Di-amyl-tin maleate | 200 | 0 | 100 |
| 4/4 | Unmedicated controls | | 296 | |
| 4/4 | Di-n-butyl-tin sulfide | 300 | 0 | 100 |
| 4/4 | ...do | 400 | 0 | 100 |
| 4/4 | Unmedicated controls | | 296 | |
| 3/3 | Dimethyl-tin diacetate | 50 | 0 | 100 |
| 7/7 | Unmedicated controls | | 337 | |
| 4/4 | Di-n-butyl-tin diabietate | 200 | 49 | 95 |
| 8/8 | Unmedicated controls | | 200 | |
| 4/4 | Di-n-butyl-tin diphenoxide | 100 | 28 | 92 |
| 4/4 | ...do | 200 | 0 | 100 |
| 8/8 | Unmedicated controls | | 696 | |
| 4/4 | Di-n-butyl-tin dibenzoate | 200 | 2 | 99 |
| 8/8 | Unmedicated controls | | 489 | |
| 4/4 | Di-n-butyl-tin stannonic acid | 300 | 0 | 100 |
| 4/3 | ...do | 400 | 0 | 100 |
| 8/8 | Unmedicated controls | | 119 | |
| 4/4 | Di-n-butyl-tin dimandelate | 100 | 0 | 100 |
| 4/4 | ...do | 200 | 0 | 100 |
| 8/8 | Unmedicated controls | | 256 | |
| 4/4 | Di-n-butyl-tin di-d-gluconate | 200 | 0 | 100 |
| 8/8 | Unmedicated controls | | 256 | |
| 4/4 | Di-n-butyl-tin methoxide | 100 | 5 | 98 |
| 4/4 | ...do | 200 | 8 | 97 |
| 8/8 | Unmedicated controls | | 464 | |
| 3/3 | Di-n-butyl-tin dibutoxide | 100 | 0 | 100 |
| 4/4 | ...do | 200 | 0 | 100 |
| 6/6 | Unmedicated controls | | 205 | |
| 4/4 | Di-n-butyl-tin (hydroxy)mercapto-thio-acetate polymer | 200 | 0 | 100 |
| 8/8 | Unmedicated controls | | 149 | |
| 4/3 | Di-n-butyl-tin arsonate | 100 | 0 | 100 |
| 4/4 | ...do | 200 | 0 | 100 |
| 8/8 | Unmedicated controls | | 149 | |
| 5/5 | Di-n-butyl-tin di-(mercaptide-ethyl-caprate) | 100 | 13 | 94 |
| 8/7 | Unmedicated controls | | 287 | |
| 4/4 | Di-n-butyl-tin di-(mercaptide-2-butyl-octyl-acetate) | 200 | 27 | 77 |
| 7/6 | Unmedicated controls | | 176 | |
| 4/4 | Di-n-butyl-tin mercapto-thio-succinate polymer | 100 | 1 | 99 |
| 4/4 | ...do | 200 | 0 | 100 |
| 4/4 | Unmedicated controls | | 122 | |
| 4/4 | Di-n-butyl-tin ethoxide-ethyl-mercaptide polymer | 100 | 0 | 100 |
| 4/4 | ...do | 200 | 0 | 100 |
| 7/5 | Unmedicated controls | | 73 | |
| 4/3 | Di-n-butyl-tin di-(mercaptide-butylacetate) | 300 | 0 | 100 |
| 4/4 | Unmedicated controls | | 122 | |

Table XII

FEED MEDICATION FOR RAILLIETINA CESTICILLUS

| No. Birds; No. Infected | Compound | Dose, mg./100 gm. Days | Calc. Dose, mg./kg. Body Wt. | Tapeworms at Necropsy, No. | Efficacy, Percent |
|---|---|---|---|---|---|
| 4/3 | Diethyl-tin di-iodide | 50/1 | 37 | 52 | 28 |
| 4/3 | ...do | 50/2 | 80 | 28 | 61 |
| 10/8 | Unmedicated controls | | | 193 | |
| 4/4 | Di-allyl-tin dilaurate | 50/1 | 42 | 109 | 0 |
| 4/4 | ...do | 50/2 | 71 | 27 | 73 |
| 8/8 | Unmedicated controls | | | 216 | |
| 8/7 | Di-n-butyl-tin-di-chloride | 75/2 | 140 | 0 | 100 |
| 10/10 | Unmedicated controls | | | 379 | |
| 8/6 | Di-n-butyl-tin oxide | 75/2 | 158 | 0 | 100 |
| 10/10 | Unmedicated controls | | | 379 | |
| 10/9 | Di-n-butyl-tin oxide | 50/1 | 31 | 2 | 99 |
| 10/9 | ...do | 50/2 | 59 | 0 | 100 |
| 11/11 | Unmedicated controls | | | 159 | |
| 4/4 | Di-n-butyl-tin diacetate | 50/1 | 44 | 0 | 100 |
| 4/2 | ...do | 50/2 | 76 | 0 | 100 |
| 8/8 | Unmedicated controls | | | 76 | |
| 4/4 | Di-n-butyl-tin di-n-butyrate | 50/1 | 42 | 38 | 73 |
| 4/3 | ...do | 50/2 | 49 | 0 | 100 |
| 11/11 | Unmedicated controls | | | 379 | |
| 4/4 | Di-n-butyl-tin di-valerate | 50/1 | 46 | 7 | 88 |
| 4/2 | Di-n-butyl-tin di-valerate | 50/2 | 92 | 0 | 100 |
| 5/5 | Unmedicated controls | | | 75 | |
| 4/4 | Di-n-butyl-tin di-heptylate | 50/1 | 49 | 12 | 91 |
| 4/3 | ...do | 50/2 | 116 | 0 | 100 |
| 11/11 | Unmedicated controls | | | 379 | |
| 4/4 | Di-n-butyl-tin di-undecylenate | 50/1 | 36 | 14 | 90 |
| 4/4 | ...do | 50/2 | 91 | 6 | 96 |
| 11/11 | Unmedicated controls | | | 379 | |
| 8/6 | Di-n-butyl-tin dilaurate | 50/1 | 46 | 14 | 76 |
| 7/5 | ...do | 50/2 | 86 | 7 | 85 |
| 8/8 | Unmedicated controls | | | 76 | |
| 8/5 | Di-n-butyl-tin dilaurate | 100/1 | 147 | 0 | 100 |
| 8/7 | ...do | 100/2 | 305 | 0 | 100 |
| 8/5 | Unmedicated controls | | | 57 | |
| 11/9 | Di-n-butyl-tin dilaurate | 100/2 | 185 | 0 | 100 |
| 11/8 | ...do | 50/4 | 243 | 0 | 100 |
| 9/9 | Unmedicated controls | | | 233 | |
| 8/4 | Di-n-butyl-tin sulfide | 50/1 | 45 | 24 | 87 |
| 8/4 | ...do | 50/2 | 102 | 0 | 100 |
| 16/16 | Unmedicated controls | | | 720 | |
| 4/4 | Di-amyl-tin maleate | 50/1 | 41 | 1 | 99 |
| 4/4 | ...do | 50/2 | 71 | 0 | 100 |
| 8/8 | Unmedicated controls | | | 224 | |
| 4/4 | Di-n-butyl-tin di-hydrogenphosphate | 50/1 | 52 | 90 | 55 |
| 4/4 | ...do | 50/2 | 93 | 14 | 93 |
| 8/8 | Unmedicated controls | | | 402 | |
| 4/4 | Di-n-butyl-tin di-oleate | 100/1 | 89 | 37 | 74 |
| 4/4 | ...do | 100/2 | 185 | 0 | 100 |
| 8/8 | Unmedicated controls | | | 280 | |
| 4/4 | Di-n-butyl-tin di-para-a-cumyl-phenolate | 50/2 | 72 | 32 | 84 |
| 7/7 | Unmedicated controls | | | 343 | |
| 4/4 | Di-n-butyl-tin di-methacrylate | 200/1 | 264 | 9 | 96 |
| 4/4 | ...do | 200/2 | 536 | 0 | 100 |
| 6/6 | Unmedicated controls | | | 344 | |
| 4/4 | Di-isopropyl-tin oxide | 50/2 | 106 | 14 | 85 |
| 7/7 | Unmedicated controls | | | 168 | |
| 4/4 | Di-n-butyl-tin di-palmitate | 50/2 | 115 | 0 | 100 |
| 16/16 | Unmedicated controls | | | 720 | |
| 4/4 | Di-n-butyl-tin di-fluoride | 50/1 | 41 | 4 | 98 |
| 4/4 | Unmedicated controls | | | 382 | |
| 4/4 | Di-n-butyl-tin arsonate | 50/2 | 76 | 1 | 99 |
| 6/6 | Unmedicated controls | | | 205 | |
| 4/4 | Di-n-butyl-tin (hydroxy) mercaptoacetate polymer | 50/1 | 44 | 1 | 99 |
| 4/4 | ...do | 50/2 | 97 | 0 | 100 |
| 6/6 | Unmedicated controls | | | 149 | |
| 4/4 | Di-n-butyl-tin di-(mercaptide-isooctylacetate) | 50/2 | 80 | 0 | 100 |
| 8/8 | Unmedicated controls | | | 149 | |
| 4/4 | Di-n-butyl-tin di-(mercaptide-ethyl-hexyl-succinate) | 50/2 | 86 | 19 | 90 |
| 8/8 | Unmedicated controls | | | 376 | |
| 4/4 | Di-n-butyl-tin di-(mercaptide-2-butyl-octyl-acetate) | 100/2 | 155 | 24 | 87 |
| 8/8 | Unmedicated controls | | | 376 | |
| 5/4 | Di-n-butyl-tin di-(mercaptide-ethyl-caprate) | 50/2 | 83 | 0 | 100 |
| 8/7 | Unmedicated controls | | | 287 | |
| 4/4 | Di-n-butyl-tin mercapto-thio-succinate polymer | 50/2 | 98 | 0 | 100 |
| 7/6 | Unmedicated controls | | | 176 | |
| 4/4 | Di-n-butyl-tin ethoxide-ethyl-mercaptide polymer | 50/2 | 87 | 2 | 96 |
| 7/5 | Unmedicated controls | | | 73 | |

Table XIII

CAPSULE MEDICATION FOR ASCARIDIA GALLI

| No. Birds; No. Infected | Compound | Dose, mg./kg. Body Wt. | Total Ascaridia galli, No. | Removed, No. | Efficacy, Percent |
|---|---|---|---|---|---|
| 4/4 | Diethyl-tin di-iodide | 100 | 38 | 38 | 100 |
| 4/4 | ...do | 200 | 9 | 9 | 100 |
| 4/2 | Di-isopropyl-tin di-iodide | 100 | 21 | 20 | 95 |
| 4/4 | ...do | 200 | 26 | 25 | 96 |
| 4/3 | Di-n-butyl-tin dichloride | 100 | 4 | 2 | 50 |
| 4/3 | ...do | 200 | 56 | 52 | 93 |
| 4/4 | Di-n-butyl-tin oxide | 100 | 76 | 16 | 21 |
| 4/4 | ...do | 200 | 30 | 20 | 65 |
| 3/3 | Di-n-butyl-tin diacetate | 100 | 63 | 35 | 56 |
| 4/4 | ...do | 200 | 234 | 160 | 68 |
| 4/4 | Di-n-butyl-tin dipropionate | 100 | 84 | 48 | 57 |

Table XIII—Continued.
CAPSULE MEDICATION FOR *ASCARIDIA GALLI*

| No. Birds; No. Infected | Compound | Dose, mg./kg. Body Wt. | Total Ascaridia galli, No. | Removed, No. | Efficacy, Percent |
|---|---|---|---|---|---|
| 4/4 | Di-n-butyl-tin dipropionate | 200 | 116 | 76 | 66 |
| 4/4 | Di-n-butyl-tin di-n-butyrate | 100 | 118 | 65 | 55 |
| 4/4 | ....do.... | 200 | 80 | 66 | 83 |
| 4/3 | Di-n-butyl-tin divalerate | 100 | 18 | 11 | 61 |
| 4/4 | Di-n-butyl-tin di-n-heptylate | 100 | 52 | 9 | 17 |
| 4/4 | ....do.... | 200 | 12 | 8 | 67 |
| 4/1 | ....do.... | 400 | 1 | 1 | 100 |
| 4/4 | Di-n-butyl-tin di-n-caprylate | 100 | 38 | 25 | 66 |
| 4/4 | Di-n-butyl-tin di-n-caprate | 100 | 56 | 12 | 21 |
| 4/4 | ....do.... | 200 | 23 | 12 | 52 |
| 3/3 | Di-n-butyl-tin dilaurate | 75 | 36 | 4 | 11 |
| 3/3 | ....do.... | 100 | 10 | 4 | 40 |
| 3/3 | ....do.... | 150 | 22 | 12 | 55 |
| 2/1 | ....do.... | 200 | 2 | 2 | 100 |
| 3/2 | Di-n-butyl-tin maleate | 100 | 12 | 9 | 75 |
| 3/2 | ....do.... | 300 | 17 | 17 | 100 |
| 4/3 | Di-benzyl-tin dichloride | 100 | 9 | 1 | 11 |
| 4/3 | ....do.... | 200 | 10 | 6 | 60 |
| 4/3 | Di-n-butyl-tin sulfate | 100 | 10 | 5 | 50 |
| 4/4 | ....do.... | 200 | 15 | 9 | 60 |
| 4/3 | Complex di-n-butyl-tin oxide-dichloride polymer | 100 | 35 | 33 | 94 |
| 4/4 | ....do.... | 200 | 10 | 10 | 100 |
| 4/1 | Di-n-butyl-tin sulfide | 400 | 1 | 1 | 100 |
| 4/4 | Di-n-butyl-tin phenoxide | 100 | 158 | 17 | 11 |
| 4/4 | ....do.... | 200 | 117 | 78 | 67 |
| 4/4 | Di-n-butyl-tin di-d-gluconate | 200 | 42 | 38 | 91 |
| 4/3 | Di-n-butyl-tin oxide | 400 | 115 | 79 | 69 |
| 3/3 | Di-n-butyl-tin dibutoxide | 100 | 14 | 14 | 100 |
| 4/4 | ....do.... | 200 | 34 | 34 | 100 |
| 4/4 | Di-n-butyl-tin (hydroxy) mercapto-thio-acetate polymer | 200 | 206 | 196 | 95 |
| 4/3 | Di-n-butyl-tin di-(mercaptide-iso-octylacetate) | 200 | 91 | 82 | 90 |
| 4/4 | Di-n-butyl-tin arsonate | 100 | 67 | 59 | 88 |
| 4/4 | ....do.... | 200 | 68 | 65 | 96 |
| 5/5 | Di-n-butyl-tin di-(mercaptide-ethyl-caprate) | 200 | 86 | 79 | 92 |
| 4/4 | Di-n-butyl-tin ethoxide-ethyl-mercaptide polymer | 200 | 28 | 28 | 100 |

Table XIV
FEED MEDICATION FOR *ASCARIDIA GALLI*

| No. Birds: No. Infected | Compound | Dose, mg./100 gm. Days | Calc. Dose, mg./kg. Body Wt. | Total A. galli, No. | Removed, No. | Efficacy, Percent |
|---|---|---|---|---|---|---|
| 4/4 | Diethyl-tin di-iodide | 50/1 | 37 | 39 | 34 | 87 |
| 4/4 | ....do.... | 50/2 | 80 | 26 | 23 | 88 |
| 8/8 | Di-n-butyl-tin dichloride | 75/2 | 140 | 49 | 42 | 86 |
| 10/7 | Di-n-butyl-tin oxide | 50/1 | 31 | 15 | 12 | 60 |
| 10/6 | ....do.... | 50/2 | 59 | 20 | 20 | 100 |
| 4/3 | Di-n-butyl-tin diacetate | 50/1 | 44 | 34 | 17 | 50 |
| 4/4 | ....do.... | 50/2 | 76 | 33 | 33 | 100 |
| 4/3 | Di-n-butyl-tin di-n-butyrate | 50/1 | 42 | 18 | 6 | 33 |
| 4/4 | ....do.... | 50/2 | 49 | 36 | 33 | 92 |
| 4/3 | Di-n-butyl-tin di-undecylenate | 50/1 | 36 | 27 | 24 | 90 |
| 8/8 | Di-n-butyl-tin dilaurate | 50/1 | 46 | 89 | 22 | 25 |
| 7/7 | ....do.... | 50/2 | 86 | 60 | 36 | 60 |
| 8/8 | ....do.... | 160/1 | 147 | 182 | 31 | 17 |
| 8/8 | ....do.... | 160/2 | 305 | 131 | 127 | 100 |
| 4/3 | Di-n-butyl-tin maleate | 50/1 | 42 | 5 | 2 | 40 |
| 4/3 | ....do.... | 50/2 | 86 | 65 | 52 | 80 |
| 4/4 | Di-n-butyl-tin dichloride | 50/1 | 28 | 13 | 4 | 30 |
| 4/3 | ....do.... | 50/2 | 66 | 12 | 9 | 75 |
| 4/4 | Di-n-butyl-tin sulfate | 50/1 | 40 | 29 | 7 | 24 |
| 4/3 | ....do.... | 50/2 | 80 | 7 | 4 | 57 |
| 4/3 | Di-amyl-tin maleate | 50/1 | 41 | 10 | 1 | 10 |
| 4/3 | ....do.... | 50/2 | 71 | 11 | 6 | 54 |
| 4/4 | Di-carbethoxy-ethyl-methyl-tin dibromide | 100/1 | 95 | 34 | 21 | 62 |
| 4/4 | Di-n-butyl-tin dimethacrylate | 200/1 | 264 | 35 | 14 | 40 |
| 4/3 | ....do.... | 200/2 | 536 | 24 | 17 | 71 |
| 4/4 | Di-n-butyl-tin difluoride | 50/1 | 41 | 35 | 25 | 57 |
| 4/3 | Di-n-butyl-tin arsonate | 50/2 | 76 | 51 | 40 | 78 |
| 4/4 | Di-n-butyl-tin di-(mercaptide-2-butyl-octyl-succinate) | 100/1 | 75 | 10 | 5 | 50 |
| 4/4 | Di-methyl-tin di-acetate | 50/1 | 23 | 1 | 1 | 100 |

On comparing efficacy figures for capsule and alimentary treatments, it appears that some of the compounds develop a greater potency when given in the feed than when administered in single medication units. For instance, di-n-butyl-tin di-n-heptylate against *Raillietina cesticillus* shows an efficacy of 44% at 100 mg./kg. body weight capsule dosage, while its activity rises to 91% when given in the feed after only 44 mg./kg. body weight of the drug has been consumed. It seems as though the potency of the compound increases when the alimentary method of administration is used. The following Table XV illustrates additional instances wherein the compounds develop a multiple of their activity when given in feed as compared with capsule treatments.

Table XV
CAPSULE AND FEED MEDICATION FOR *RAILLIETINA CESTICILLUS* AND *ASCARIDIA GALLI*

| Compound | Capsule Dose, mg./kg. Body Wt. | Feed Calc. Dose, mg./kg. Body Wt. | Efficacy, Percent | |
|---|---|---|---|---|
| | | | Capsule | Feed |
| | | | *Raillietina cesticillus* | *Raillietina cesticillus* |
| Di-n-butyl-tin di-acetate | 100 | 44 | 76 | 100 |
| Di-n-butyl-tin di-n-butyrate | 100 | 49 | 94 | 100 |
| Di-n-butyl-tin di-n-valerate | 100 | 92 | 51 | 100 |
| Di-n-butyl-tin di-n-heptylate | 100 | 49 | 44 | 91 |
| Di-n-butyl-tin di-undecylenate | 100 | 36 | 12 | 90 |
| Di-n-butyl-tin dilaurate | 100 | 46 | 93 | 76 |
| Di-n-butyl-tin maleate | 100 | 42 | 80 | 97 |
| Di-allyl-tin dilaurate | 200 | 71 | 62 | 73 |
| Di-n-butyl-tin sulfate | 100 | 40 | 87 | 99 |
| | | | *Ascaridia galli* | *Ascaridia galli* |
| Di-n-butyl-tin di-acetate | 100 | 76 | 56 | 100 |
| Di-n-butyl-tin di-n-butyrate | 100 | 49 | 55 | 92 |
| Di-n-butyl-tin oxide | 100 | 59 | 21 | 100 |

No scientific explanation can be offered so far for this phenomenon. However, it may possibly be connected with the size of the surface area of the carrier from which the compound evolves its anthelmintic action. Indications in this direction are found in the fact that solid materials other than feed, such as fuller's earth and other clays, show the same potentiating effect. It is obvious, however, that this mode of administration greatly enhances the usefulness of our novel preparations as vermifugal remedies. While treatment with single medication units makes it necessary to capture individually the animals to insert the capsule or tablet into their throat, the treatment with many of our compounds can be managed without these efforts by simple feed medication. Furthermore, the increase in anthelmintic potency provides for greater economy, particularly in cases where the same effect can be reached in feed with the third or fourth part of the dose otherwise required by the usual methods of capsule administration.

As already mentioned, our new vermifugal substances are likewise adapted to be used on other animals. As an illustration, an adult mongrel dog of an approximate weight of 25 kg. was parasitized with *Taenia pisiformis* and treated with 1.25 gm. of di-n-butyl-tin dilaurate corresponding to 50 mg. per kg. body weight. The compound was given in two capsules. On the following day numerous proglottids and strobilae without scolices were recovered from the feces and no further discharge of such segments and whole worms was observed thereafter until the dog was sacrificed. Necropsy revealed the presence of but an insignificant number of taeniae, indicating a considerable activity of the compound. No toxic reactions of any consequence were observed following medication as evidenced by normal appetite and stools.

What we claim is:
1. A veterinary composition effective in the control of protozoal and helminthic infections and in enhancing the meat producing capacity and maturation of fowl and domesticated animals, comprising an orally ingestible vehicle containing a small, but effective nontoxic amount amount of di-n-butyl-tin maleate, said compound being present in an amount of not less than 0.0025% by weight of the composition.

2. A veterinary composition in accordance with claim 1, in which the orally ingestible vehicle is an animal feed ration.

3. A veterinary composition in accordance with claim 1, in which the orally ingestible vehicle is an aqueous drinking preparation.

4. A nontoxic veterinary composition in dosage unit form effective in the control of helminthic infections in fowl and domesticated animals comprising a pharmaceutical carrier containing at least 3 mg. per dosage unit of di-n-butyl tin maleate.

References Cited in the file of this patent

UNITED STATES PATENTS

| | | |
|---|---|---|
| 2,323,218 | Guthrie | June 29, 1943 |
| 2,344,002 | Rugeley | Mar. 14, 1944 |
| 2,422,411 | Guthrie | June 17, 1947 |
| 2,560,034 | Eberly | July 10, 1951 |

OTHER REFERENCES

Whitmore, Organic Chemistry (1937), p. 220.

Handbook of Chemistry and Physics, 28th Ed. (1944), pp. 1032 to 1035.

Guthrie, American Journal of Veterinary Research, vol. 2, January 1941, pp. 108 to 116.